(12) United States Patent
Findlay

(10) Patent No.: US 8,937,396 B2
(45) Date of Patent: Jan. 20, 2015

(54) WAVE ENERGY POWER CONVERSION MECHANISM

(75) Inventor: David Findlay, Midlothian (GB)

(73) Assignee: Albatern Limited, Midlothian (GB)

( * ) Notice: Subject to any disclaimer, the term of this patent is extended or adjusted under 35 U.S.C. 154(b) by 43 days.

(21) Appl. No.: 13/911,316

(22) PCT Filed: Dec. 12, 2011

(86) PCT No.: PCT/GB2011/001710
§ 371 (c)(1),
(2), (4) Date: Aug. 28, 2013

(87) PCT Pub. No.: WO2012/076856
PCT Pub. Date: Jun. 14, 2012

(65) Prior Publication Data
US 2014/0183868 A1    Jul. 3, 2014

(30) Foreign Application Priority Data

Dec. 10, 2010    (GB) .................................. 1020993.0

(51) Int. Cl.
*F03B 13/12*    (2006.01)
*F03B 13/16*    (2006.01)
(Continued)

(52) U.S. Cl.
CPC ............ *F03B 13/16* (2013.01); *F03B 13/1815* (2013.01); *F03B 13/182* (2013.01); *F03B 13/20* (2013.01); *F03B 13/10* (2013.01); *Y02E 10/38* (2013.01)
USPC .......................................................... 290/53

(58) Field of Classification Search
USPC .................... 290/42, 53; 60/495–507; 405/76
See application file for complete search history.

(56) References Cited

U.S. PATENT DOCUMENTS

| 675,039 | A | * | 5/1901 | Graff .............................. 60/499 |
| 2,278,818 | A | | 4/1942 | Arthur | |

(Continued)

FOREIGN PATENT DOCUMENTS

| GB | 2028435 A | 3/1980 |
| GB | 2467011 A | 7/2010 |

(Continued)

OTHER PUBLICATIONS

International Search Report for corresponding PCT Application No. PCT/GB2011/001710 filed Dec. 12, 2011.

*Primary Examiner* — Tulsidas C Patel
*Assistant Examiner* — Viet Nguyen
(74) *Attorney, Agent, or Firm* — Olive Law Group, PLLC

(57) ABSTRACT

The present invention provides a power conversion mechanism incorporated as part of a wave energy converter device which utilizes the kinetic energy of an incident wave field experienced through the relative motion of a body or any other similar means connected to a reactive structure resulting in the localization of mechanical forces towards a central nodal point for subsequent exploitation via conversion to a useful form. It comprises a mechanical coupling connectable between a reactive body and a wave actuated body with a first body connectable to the reactive body and a second body connectable to the wave actuated body, the first body and the second body being rotatably coupled together about an axis of rotation. A linear energy conversion device is connected to the mechanical coupling and to a crank arm, the crank arm being rotatably connected to the first body and the second body and connected to a reciprocating member of the linear energy conversion device such that relative angular rotation of the first and second body is converted into linear motion in the reciprocating member.

12 Claims, 6 Drawing Sheets

(51) Int. Cl.
*F03B 13/18* (2006.01)
*F03B 13/20* (2006.01)
*F03B 13/10* (2006.01)

(56) References Cited

U.S. PATENT DOCUMENTS 3,151,564 A * 10/1964 Rosenberg .................. 60/499
4,210,821 A * 7/1980 Cockerell .................. 290/53
7,131,269 B2 * 11/2006 Koivusaari .................. 60/495
8,618,686 B2 * 12/2013 Jo .................. 290/53
2008/0191485 A1 8/2008 Whittaker et al.
2009/0056327 A1 * 3/2009 Raikamo et al. .................. 60/506

FOREIGN PATENT DOCUMENTS

| WO | 2004/007953 A1 | 1/2004 |
| WO | 2004088129 A1 | 10/2004 |
| WO | 2008094046 A1 | 8/2008 |

* cited by examiner

WAVE ENERGY POWER CONVERSION MECHANISM

CROSS REFERENCE TO RELATED APPLICATIONS

This application is a 35 USC 371 application of PCT International Patent Application No. PCT/GB2011/001710 filed Dec. 12, 2011, and further claims priority to GB 1020993.0 filed Dec. 10, 2010, the entire contents of both of which are hereby incorporated by reference herein.

INTRODUCTION

The present invention relates to the field of wave energy and in particular to a mechanism for the efficient conversion of rotational or other reciprocal movement as commonly found in wave energy converters into hydraulic power.

BACKGROUND

There have been many attempts to develop commercially viable systems to harness the energy from ocean waves. None have yet succeeded in doing so. A successful and economically viable wave energy system must be both robust and efficient. It must be correctly matched to the variety of wave climates that it will be expected to operate in during its lifetime and it must have a sufficiently high power to weight ratio to justify the considerable cost of transportation, installation and deployment.

In general, a wave energy system must by necessity comprise at least two bodies. The first of these is the Wave Actuated Body (WAB) which is the body that is primarily subject to the influence of the waves, the second is a reactive body to which reference is made as power is removed from the system. A wave energy system must also include a power take-off (PTO) system that converts the mechanical energy in the relative motion of the two bodies into a more suitable (or higher valued) form for human consumption.

A wave energy system is ultimately actuated by dynamic pressure and velocity gradients within the water column. These gradients oscillate with the incident wave period which for a typical northern hemisphere location might be in the region of 8 to 12 seconds. Wave Energy systems are therefore typically characterised by low speed and high load reciprocating motions.

A PTO within a wave energy system will, ideally, convert the high load, low speed input motion into a continuous flow of electricity, potable water, hydrogen, heat or any other suitable product than can be sold for commercial advantage. The PTO system will typically require one or more intermediary stages which may be mechanical, hydraulic, pneumatic or electrical and the system includes the necessary conversion and transmission components to facilitate the conversion process.

Hydraulic power take-off systems are a common feature of Wave Energy Converter designs due to their high load, low speed operating characteristics and high power to weight ratio. Examples of wave energy systems utilising hydraulic PTO include patent documents WO 2004/007953, GB2467011A and [WO 2004/088129 A1.

In addition, the design of a viable wave energy system is complicated by the need to ensure that the mechanism does not encounter an end stop during any anticipated operation. A mechanical hard stop (or end stop) will result in high structural loading and the potential for catastrophic failure if it acts to restrain the free motion of the device. As it is difficult to predict the maximum wave that a given site will experience during the lifetime of a device end stops should be avoided where possible.

The design of a wave energy system must also use either a rotating or linear conversion device. While a rotating system is essentially unconstrained by the 'end stop' problem, motions will typically be reciprocating and of low amplitude. Conventional rotating machinery is generally designed for high speed operation and unsuitable for this application.

One common approach as described in patent document GB2467011A is to locate a crank arm on a rotating joint and use a linear conversion mechanism. While this solution deals with the end stop problem, it necessarily limits the useful stroke of the ram to twice the length of the crank arm. In operation the device will typically only utilise a fraction of this available stroke due to the small rotational amplitude.

A wave energy device will typically be constrained by the load that the bearings can withstand. In seeking to increase the power transmitted through a hydraulic ram the designer has the option of increasing the pressure of the hydraulic system, the bore of the ram or the stroke of the ram. The first two of these options will necessarily increase the bearing load and ultimately constrain the power output of the device. At this point more power can only be delivered by increasing the active stroke length of the ram.

A further issue in wave energy is the production of high quality power—(which may be defined as a smooth and consistent flow of power). The primary conversion mechanism in the power conversion train of a wave energy converter will typically encounter cyclic loading and will therefore result in pulses of energy delivered at the incident wave frequency. By incorporating double acting components into the primary conversion mechanism it is possible to increase the apparent frequency at which the power is delivered to the secondary conversion device. The delivered power can be further smoothed by incorporating correctly sized accumulators, or energy storage devices, between the primary and secondary conversion systems. Many developers of wave energy converters have adopted this approach as disclosed in patent documents U.S. 2008/0231054 A1 and U.S. 2008/0191485 A1.

An enhanced means of providing a smooth flow of power is shown in patent document GB0900685.9 where the wave field is sampled at numerous points to provide phase shifting and a continuous flow of power. This patent describes the use of a tri-axial node member that allows energy to be captured from out of plane motions and delivers a local phase difference between three primary PTO components collocated at a single nodal point.

SUMMARY OF THE INVENTION

In accordance with a first aspect of the invention there is provided an apparatus for converting wave energy into another form of energy, the apparatus comprising:
  a mechanical coupling connectable between a reactive body and a wave actuated body, the mechanical coupling comprising a first body connectable to the reactive body and a second body connectable to the wave actuated body, the first body and the second body being rotatably coupled together about an axis of rotation;
  a linear energy conversion device connected to the mechanical coupling and to a crank arm, the crank arm being rotatably connected to the first body and the second body and connected to a reciprocating member of the linear energy conversion device such that relative angular rotation of the first and second body is converted into linear motion in the reciprocating member.

Preferably, the reciprocal movement in the linear energy conversion device is substantially coplanar with the axis of rotation of the first and second bodies.

The crank arm of the apparatus is adapted to control the response of the translational component with respect to angular motions of the main assembly. In particular, the apparatus allows a non-proportional response where the translational movement is amplified over some defined operational range and subsequently reduced outside this range. Furthermore, the apparatus allows for a total angular displacement in excess of 180 degrees without encountering an end stop.

It will be appreciated that the reciprocating member may comprise the "fixed" or "moving" portion of a reciprocating member as exemplified by a piston and rod arrangement or other example where relative movement between two parts occurs.

Preferably, the crank arm comprises a first linkage rotatably connected to the first body and a second linkage rotatably connected to the second body, the first and second linkages being rotatably connected together to allow variation in the angle between the linkages.

Preferably, the first and second linkages are connected together at the point of connection with the reciprocating member.

Preferably, the first body is connected directly to the linear energy conversion device.

Optionally, the second body is connected directly to the linear energy conversion device.

Preferably, the second body is connected to the linear energy conversion device via the crank arm.

Optionally, the first body is connected to the linear energy conversion device via the crank arm.

Preferably, the first body comprises a first connection point at a first end thereof for effecting a connection between a reactive device and the first body, a second connection point at a second end thereof for connecting the first body to the crank arm and a third connection point positioned between the first and second connection points for effecting a connection between the first body and the second body.

Preferably, the first connection point provides the connection between the first body and the linear energy conversion device.

Preferably, the second body comprises a first connection point at a first end thereof connectable to the third connection point of the first body and a second connection point connectable to the crank arm.

The invention relates to an apparatus that is located at the interface between a Wave Actuated Body (WAB) and a reactive body.

The apparatus provides the housing for the main bearings that allow relative angular displacement between the two attached bodies. The linear energy conversion device may be a hydraulic ram, linear electrical generator, other linear energy conversion device or any other similar means of energy conversion such that relative angular motion of the two attached bodies results in a relative translational motion of the linear conversion component.

The present invention is suitable for inclusion on several existing types of wave energy converter and may be of benefit to other designs. Depending on the wave energy converter under consideration, the present invention may be installed on, above or below the water surface. In some instances it may be installed in situations where the reactive body is rigidly attached to the ground, either directly or by way of some intermediary component. In addition the invention may also be installed as the primary interface between two active components whereupon the device will be designated as self-reacting.

The present invention provides a solution to the problem of efficiently capturing energy from low speed, low amplitude reciprocating rotational motion as typically found in wave energy systems. The mechanism can be optimised such that over 90% of the total stroke of the translational conversion component is utilised by a relative angular motion of less than 40 degrees.

In the event that the wave energy system is characterised by relatively small angular displacement which is likely to be the case for the majority of devices based on similar principles as to those discussed in the prior art, then the apparatus of the present invention will act to effectively gear the mechanism over the main operating range and therefore increases the velocity of the translational component and deliver more power without increasing the pressure or load rating of the translational conversion component.

An additional advantage of the apparatus of the present invention is that power is generated according to the instantaneous relative position of the first and second bodies. When the apparatus is in the operational zone, maximum power is developed per angle of displacement. When the first and second bodies are orientated at an angle outside of the operational zone, a minimum power per degree of angular displacement is produced. Adopting this mechanism therefore allows for more efficient usage of the primary PTO conversion component.

In addition, the first and second bodies are free to move through an angle in excess of 180 degrees without encountering an end stop.

Furthermore, the present invention allows for the placement of the preceding mechanism in a triangular configuration that allows the device, when suitably constrained, to improve the consistency—and quality—of the delivered power by introducing a phase difference between the power produced by individual units.

BRIEF DESCRIPTION OF THE DRAWINGS

The present invention will now be described by way of example only with reference to the accompanying drawings in which.

DETAILED DESCRIPTION OF THE DRAWINGS

The present invention provides an apparatus for the efficient conversion of sinusoidal high torque, low speed, and small amplitude rotations (as are commonly found in wave energy converters) into other forms of energy.

Embodiments of the present invention provide a power conversion mechanism incorporated as part of a wave energy converter device which utilises the kinetic energy of an incident wave field experienced through the relative motion of a body or any other similar means connected to a reactive structure resulting in the localisation of mechanical forces towards a central nodal point for subsequent exploitation via conversion to a useful form.

Figure 1:
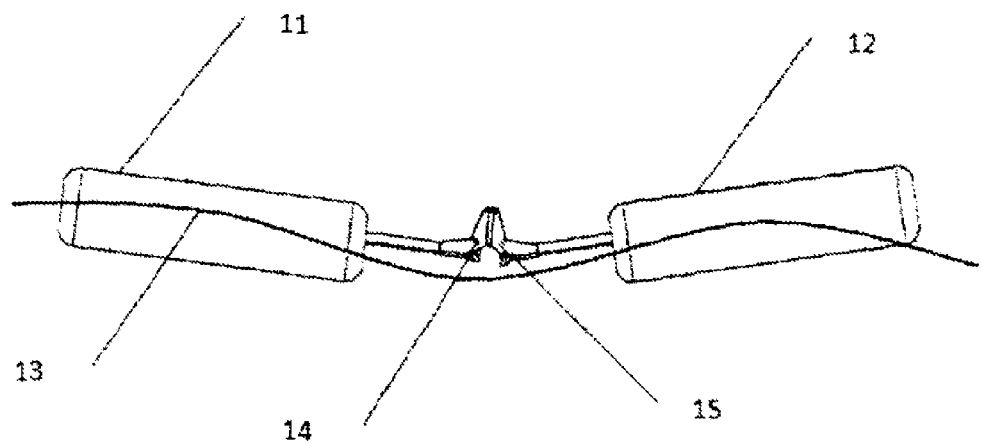
FIG. 1 is a side view of an embodiment of the present invention mounted on a raft.

FIG. 1 shows an application of the present invention where it forms part of a raft type wave energy converter. This type of wave energy converter may be referred to as a self reacting. Body 1, 11 and Body 2, 12 are positively buoyant displacement bodies that are free to respond to variations in the water surface elevation 13. The relative motion between the two bodies, 11, 12 is captured and amplified by the apparatus in accordance with the present invention 14, 15, embodiments of which are described in more detail below.

Figure 2:
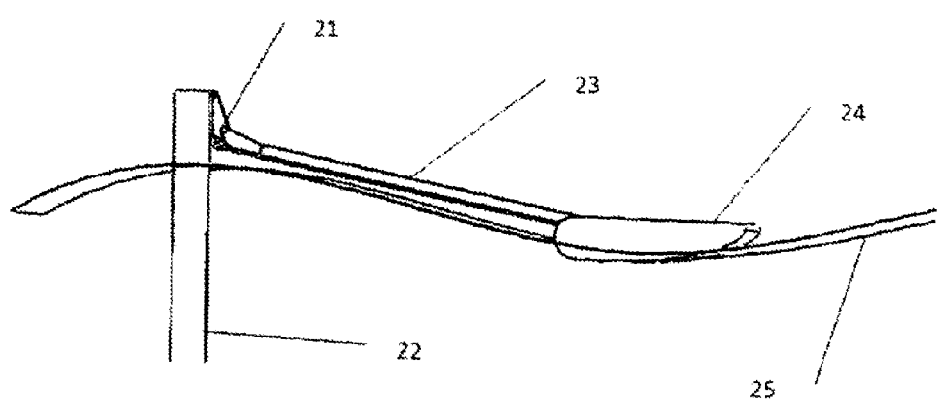
FIG. 2 is a side view of an embodiment of the present invention mounted on invention pile.

FIG. 2 shows a further possible application for the invention 21. A pile mounted wave energy converter which may be suitable for near shore or relatively shallow wave sites. In certain sites with sufficient energy densities the pile 22 may be fixed to a quayside or other coastal infrastructure. In other cases the pile is rigidly attached to the seabed through any suitable connection means. In a further scenario the pile 22 may form the foundation for an offshore wind turbine or other infrastructure. A linkage 23 of suitable length is connected by any suitable means to a buoyant member 24. Variations in the local water surface elevation 25 at the position of buoyant member 24 result in a motion of the linkage relative to the pile which in this possible application forms the reactive structure. The mechanism that forms the subject of the present invention forms the primary interface between the linkage and the pile and can be used to convert the mechanical power in the relative motion into hydraulic or electrical power as described elsewhere in the patent description.

Figure 3:
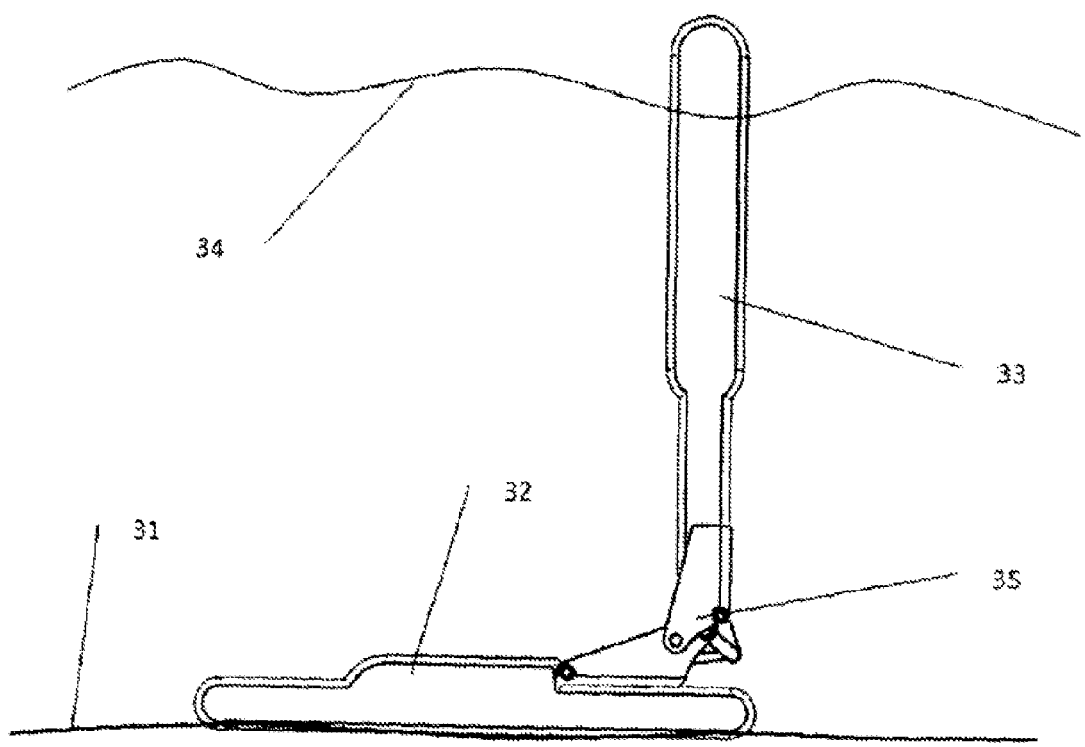
FIG. 3 is a side view of a first embodiment of the present invention mounted on a flat structure situated on the sea bed.

FIG. 3 shows an alternative application for the present invention. A flap type wave energy converter that is rigidly connected by any suitable means to the sea bed 31 either directly or indirectly by way of an intermediary body 32. The active body in this application is a body 33 of any suitable geometry whose upper end may, or may not extend through the water surface 34. In this application the invention 35 is fully submerged.

Figure 4:
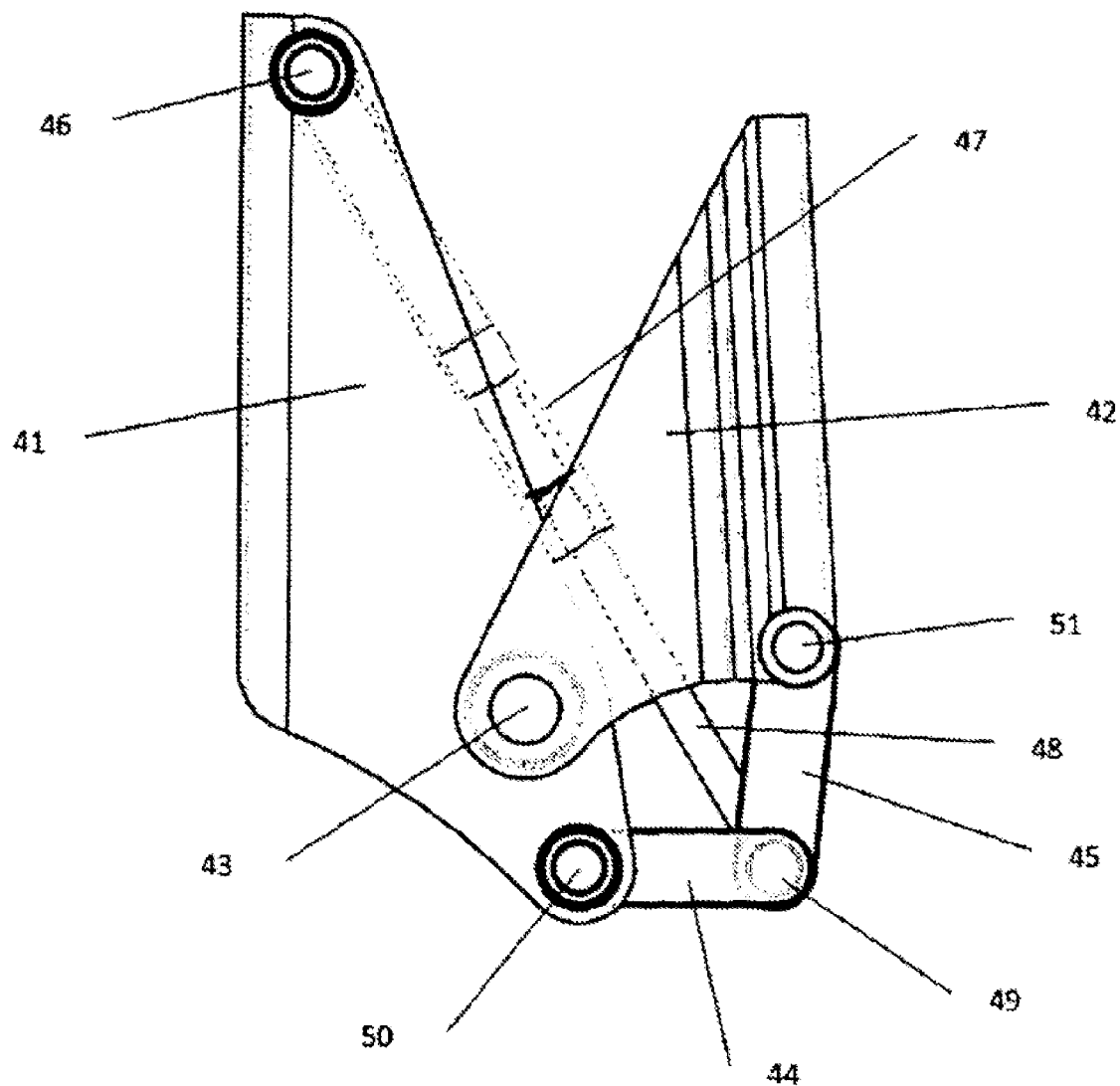
FIG. 4 is a side view of the above embodiment of the present invention in a substantially closed configuration.

FIG. 4 is a side view of the first embodiment of the present invention which has two principle bodies. Body A, 41 provides a connection to either the active or inactive body in a wave energy device. Body B 42 provides a connection to the other active or inactive body in a wave energy device. The relative motion between the two bodies 41 and 42 is restricted to a single rotational degree of freedom by means of a pin joint 43. In this embodiment of the present invention at least two additional linkages are used, namely linkage A 44 and linkage B 45 which act as a crank arm.

A translational energy conversion component which may be mechanical, hydraulic, electrical, pneumatic or any other means of transmitting, transferring or adapting a translational motion into another form which is advantageous to the developer of a wave energy machine is restrained by a pin joint 46 or any other suitable means that allows angular displacement in one or more degrees of freedom while restricted translational motion relative to body A 41.

The translational energy conversion component further comprises two parts each independent although constrained by design such that their central axis are co-linear and translational motion in at least one sense is permitted. In the case of a hydraulic translational conversion component the two parts will be the case 47 and the rod 48.

The second part of the translational energy conversion component is attached by means of a pin joint or any other suitable attachment 49 to linkage A 44 and linkage B 45. The other end of linkage A 44 is connected by means of a pin joint 50 of any suitable type to Body A 41 and the other end of linkage B 45 is connected by means of a pin joint 51 of any suitable type to Body B 42.

By consideration of the lengths of linkages A and B and the positions of pin joints 43, 46, 49, 50 and 51, it is possible to optimise the stroke of the translational conversion device such that the full stroke is delivered in a reduced angular motion of body B 42 relative to body A 41. This mechanism offers a considerable advantage over a traditional crank arm arrangement where the normal driving angle is small and yet angular motion up to and in excess of 180 degrees is required at least for some period during the lifetime of the machine. In addition the present invention solves many of the problems associated with mechanical end stops in marine energy devices.

Figure 5:
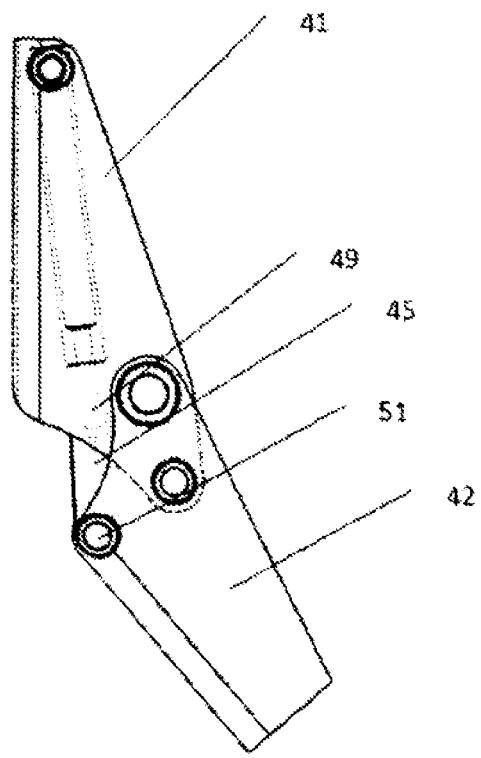
FIG. 5 is a side view of the above embodiment of the present invention in an open position approaching bottom dead centre.

FIG. 5 shows a side view of the above embodiment of the invention housing a translational energy conversion component. Considering Body A 41 as a fixed body in this arrangement, Body B 42 is free to be extended through and from an obtuse angle without hindering or causing obstruction to the motion of the translational energy conversion component mechanism. The centreline of the translational energy conversion component is approaching bottom dead centre and generally in line with linkage B, 45 and associated pin joint assemblies 49 and 51.

Figure 6:
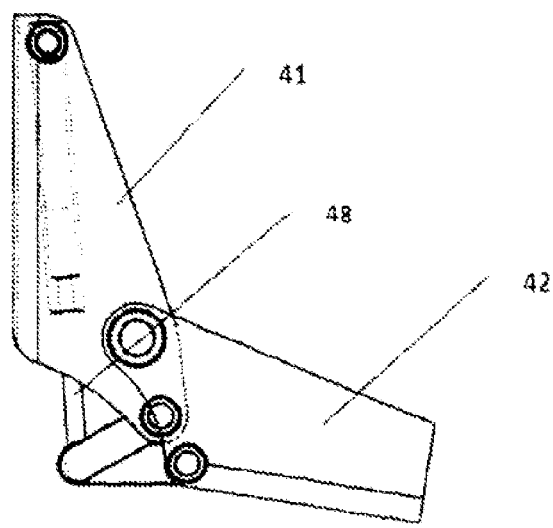
FIG. 6 is a side view of the above embodiment of the present invention in an open position within its operating range.

FIG. 6 shows a side view of the above embodiment of the present invention in normal operation with a translational component in mid stroke. Considering Body A 41 as a fixed body in this arrangement, Body B 42 is free to be move without hindering or causing obstruction to the motion of the translational energy conversion component mechanism.

Figure 7:
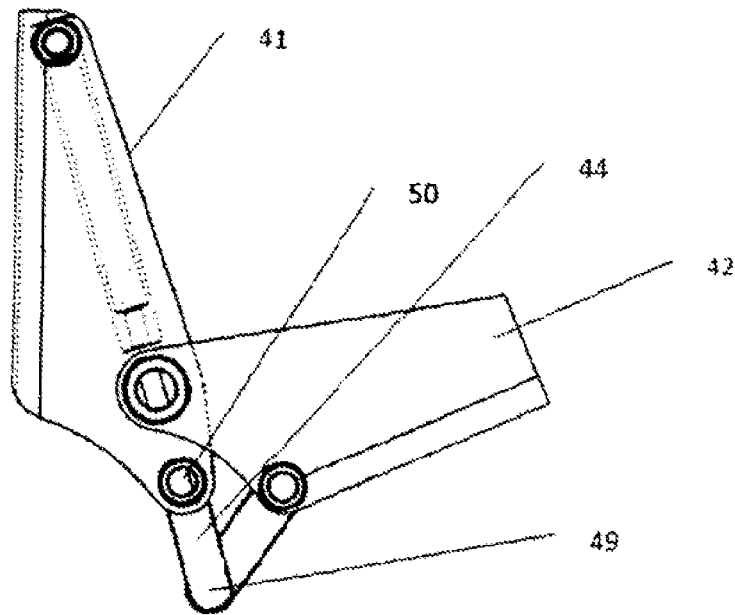
FIG. 7 is a side view of the above embodiment of the present invention at top dead centre.

FIG. 7 shows a side view of the above embodiment of the present invention housing a translational energy conversion component. Considering Body A 41 as a fixed body in this arrangement, Body B 42 is free to be extended through and from an acute angle without hindering or causing obstruction to the motion of the translational energy conversion component mechanism. The centreline of the translational energy conversion component is approaching top dead centre and generally in line with linkage A, 44 and associated pin joint assemblies 49 and 50.

Figure 8:
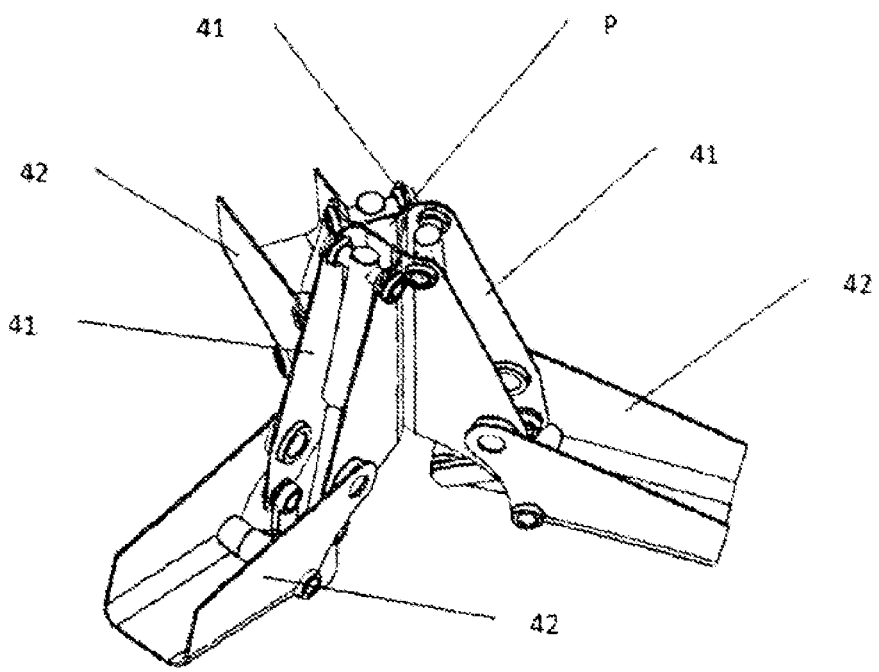
FIG. 8 is an isometric view a second embodiment of the present invention which comprises a tri-axial system.

FIG. 8 shows an isometric view of an alternative embodiment of the present invention in normal operation with the translational component in mid stroke. Three instances of the invention are arranged in a triangular arrangement about a central point P. This allows the device to be configured at the nodal point of a wave energy converter device, accepting connections to Body B 42 at 120 degrees of separation with Body A 41 fixed at P. Any number of instances of the invention may be arranged about a central point, P, such that an infinitesimal degree of separation can be approached.

Figure 9:
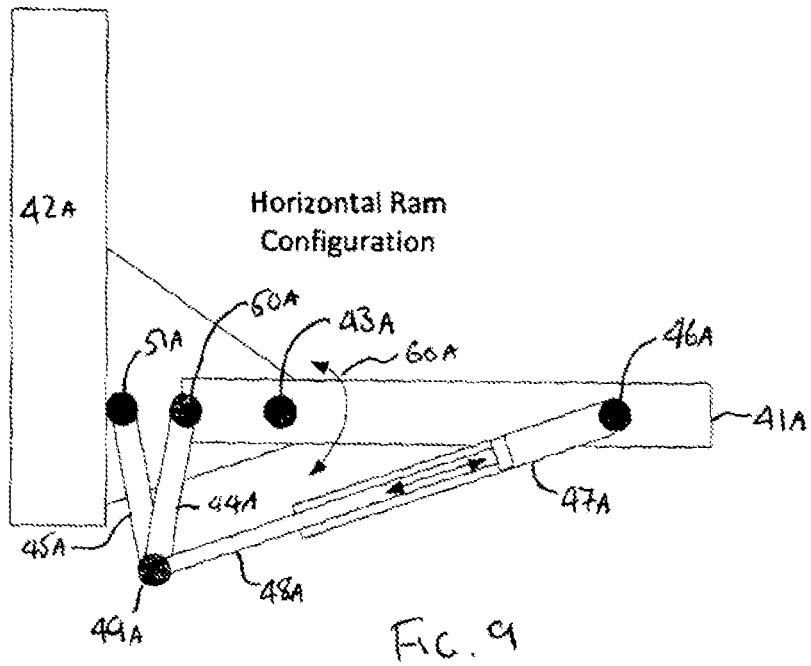
FIG. 9 is a side view of a third embodiment of the present invention.
Figure 10:
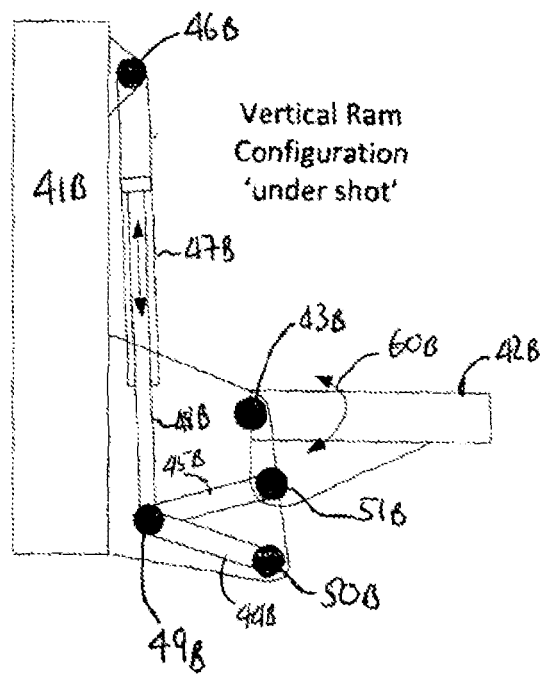
FIG. 10 is a side view of a fourth embodiment of the present invention.
Figure 11:
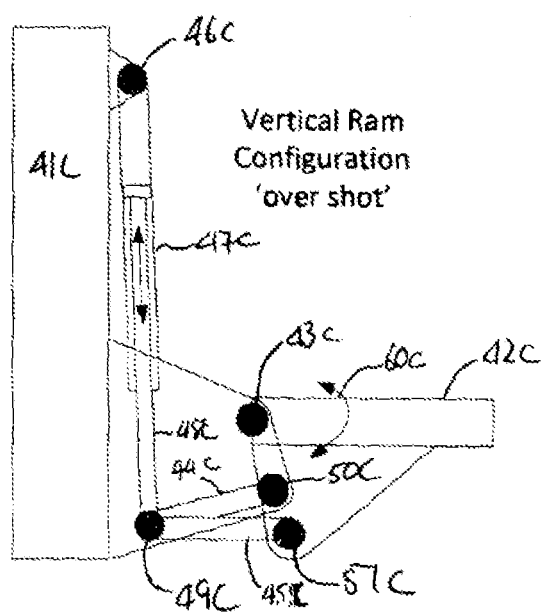
FIG. 11 is a side view of a fifth embodiment of the present invention.

FIGS. 9, 10 and 11 show further embodiments of the present invention in which the orientation of the device and the connections between the linkages which form the crank have been varied. In order to show the variations in the connectivities between the embodiments of the invention, similar reference numerals have been used with the suffix A, B or C to denote the embodiments of FIGS. 9, 10 and 11 respectively.

FIG. 9 is a side view of the fourth embodiment of the present invention which has two principal bodies. Body A, 41A provides a connection to either the active or inactive body in a wave energy device. Body B 42A provides a connection to the other active or inactive body in a wave energy device. The relative motion between the two bodies 41A and 42A is restricted to a single rotational degree of freedom by means of a rotatable joint 43A which is the main bearing and axis of rotation of the device. In this embodiment of the present invention, two linkages are used, namely linkage A 44A and linkage B 45A which act as a crank arm. The central rotatable joint 49A is connected to Body A 41A by rotatable joint 46A via the rod 48A and case 47A piston. The link 44A is connected to rotatable joint 50A on Body A 41A. The link 45A is connected to rotatable joint 51A on Body B 42A. In this example of the present invention rotation as shown by arrow 60A about the rotatable joint 43A, in a clockwise direction causes the rod 48A to move to the right and rotation about the rotatable joint 43A in an anti-clockwise direction causes the rod 48A to move to the left.

FIG. 10 is a side view of the fifth embodiment of the present invention which has two principal bodies. Body A, 41 B provides a connection to either the active or inactive body in a wave energy device. Body B 42B provides a connection to the other active or inactive body in a wave energy device. The relative motion between the two bodies 41 B and 42B is restricted to a single rotational degree of freedom by means of a rotatable joint 43B which is the main bearing and axis of rotation of the device. In this embodiment of the present invention, two linkages are used, namely linkage A 44B and linkage B 45B which act as a crank arm. The central rotatable joint 49B is connected to Body A 41 B by rotatable joint 46B via the rod 48B and case 47B piston. The link 44B is connected to rotatable joint 50B on Body A 41 B. The link 45B is connected to rotatable joint 51 B on Body B 42B and is shown above the connection between link 44B and joint 50B. In this example of the present invention rotation as shown by arrow 60B about the rotatable joint 43B, in a clockwise direction causes the rod 48B to move up and rotation in an anti-clockwise direction causes the rod 48B to move down.

FIG. 11 is a side view of the sixth embodiment of the present invention which has two principal bodies. Body A, 41C provides a connection to either the active or inactive body in a wave energy device. Body B 42C provides a connection to the other active or inactive body in a wave energy device. The relative motion between the two bodies 41C and 42C is restricted to a single rotational degree of freedom by means of a rotatable joint 43C which is the main bearing and axis of rotation of the device. In this embodiment of the present invention, two linkages are used, namely linkage A 44C and linkage B 45C which act as a crank arm. The central rotatable joint 49C is connected to Body A 41C by rotatable joint 46C via the rod 48C and case 47C piston. The link 44C is connected to rotatable joint 50C on Body A 41C. The link 45C is connected to rotatable joint 51C on Body B 42C and is shown below the connection between link 44C and joint 50C. In this example of the present invention rotation as shown by arrow 60C, about the rotatable joint 43B in a clockwise direction causes the rod 48A to move down and rotation in an anti-clockwise direction causes the rod 48C to move up.

Therefore, by selecting the configuration of the crank arm relative to bodies A and B, it is possible to select the direction of rotation which will cause a desired motion in the reciprocating member of the linear actuator.

Embodiments of the present invention may be used to increase the efficiency of operation of a standard hydraulic ram. The majority of the ram is used when the mechanism operates in the power zone. The linkage is free to move through 180 degrees without encountering an end stop.

Improvements and modifications may be incorporated herein without deviating from the scope of the invention.

The invention claimed is:

1. An apparatus for converting wave energy into another form of energy, the apparatus comprising:
    a mechanical coupling connectable between a reactive body and a wave actuated body, the mechanical coupling comprising a first body connectable to the reactive body and a second body connectable to the wave actuated body, the first body and the second body being rotatably coupled together about an axis of rotation;
    a linear energy conversion device connected to the first or second body and to a crank arm, the crank arm being rotatably connected to the first body and the second body and rotatably connected to a reciprocating member of the linear energy conversion device such that relative angular rotation of the first and second body about the axis of rotation is converted into linear motion in the reciprocating member
    wherein
    the first body comprises a first connection point at a first end thereof for effecting a connection between the linear energy conversion device and the first body, a second connection point at a second end thereof for connecting the first body to the crank arm and a third connection point positioned between the first and second connection points for effecting a connection between the first body and the second body.

2. An apparatus as claimed in claim 1 wherein, the reciprocal movement in the linear energy conversion device is substantially coplanar with the axis of rotation of the first and second bodies.

3. An apparatus as claimed in claim 1 wherein the crank arm of the apparatus is adapted to control translational movement in the linear energy conversion device with respect to angular motions of the first body and second body such that a non-proportional response where the translational movement is amplified over some defined operational range and subsequently reduced outside this range.

4. An apparatus as claimed in claim 1 wherein a total angular between the first body and the second body may be in excess of 180 degrees without encountering an end stop.

5. An apparatus as claimed in claim 1 wherein, the crank arm comprises a first linkage rotatably connected to the first body and a second linkage rotatably connected to the second body, the first and second linkages being rotatably connected together to allow variation in the angle between the linkages.

6. An apparatus as claimed in claim 5 wherein, the first and second linkages are connected together at the point of connection with the reciprocating member.

7. An apparatus as claimed in claim 1 wherein, the first body is connected directly to the linear energy conversion device.

8. An apparatus as claimed in claim 7 wherein, the first body is further connected to the linear energy conversion device via the crank arm.

9. An apparatus as claimed in claim 1 wherein, the second body is connected directly to the linear energy conversion device.

10. An apparatus as claimed in claim 9 wherein, the second body is further connected to the linear energy conversion device via the crank arm.

11. An apparatus as claimed in claim 1 wherein the first connection point provides the connection between the first body and the linear energy conversion device.

12. An apparatus as claimed in claim 1 wherein, the second body comprises a first connection point at a first end thereof connectable to the third connection point of the first body and a second connection point connectable to the crank arm.

* * * * *